June 5, 1934.    M. C. DODGE    1,961,845

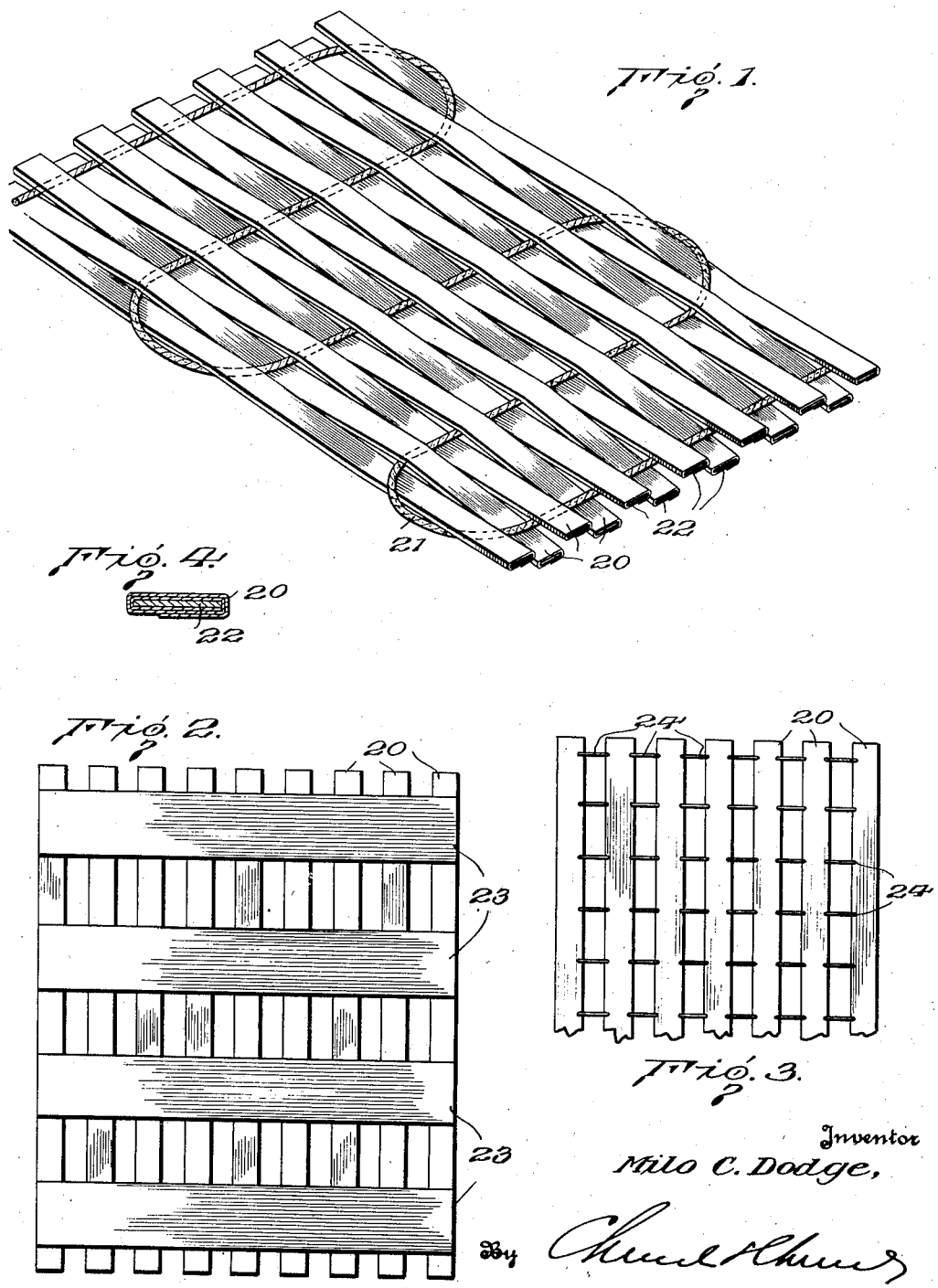

INSULATING MATERIAL FOR CABLE COVERINGS

Filed Dec. 12, 1929    2 Sheets-Sheet 2

*Fig. 5.*

| Operation | | | | Lead Sheath |
|---|---|---|---|---|
| Complete Cable | | | | |
| Clay Wash | 16 | | Clay Wash | |
| Asphalt | 15 | | A | |
| 12/3 Jute | 14 | | Jute | |
| Asphalt | 13 | | A | |
| 60/1 Jute | 12 | | ? | |
| Asphalt | 11 | | A | |
| 2" Oil Steel Tape | 10 | | Steel Tape | |
| Oil | 9 | | A | |
| 2" Oil Steel Tape | 8 | | Steel Tape | |
| Asphalt | 7 | | A | |
| 60/1 Jute | 6 | | ? | |
| Asphalt | 5 | | A | |
| 60/1 Jute | 4 | | ? | |
| Asphalt | 3 | | A | |
| 70 Asphalt Paper | 2 | | Paper | |
| Asphalt | 1 | | A | |
| Lead Sheath Cable | | | | |

Inventor

Milo C. Dodge,

By *Church & Church*

His Attorneys

Patented June 5, 1934

1,961,845

UNITED STATES PATENT OFFICE 1,961,845

INSULATING MATERIAL FOR CABLE COVERINGS

Milo C. Dodge, Auburn, N. Y., assignor to Columbian Rope Company, Auburn, N. Y., a corporation of New York Application December 12, 1929, Serial No. 413,569

9 Claims. (Cl. 28—1)

This invention relates to improvements in electrical cable constructions and particularly to a material adapted to form a part of the protective covering of electrical cables or conductors.

In electrical cable structures it is, of course, necessary to apply protective coverings thereto and where such cables are to be laid under ground these protective coverings constitute a relatively large proportion of the entire mass of the cable. Said coverings are also composed of numerous thicknesses of various materials, each of which is applied to the cable structure individually or in separate operations. In view of this the present invention contemplates a protective covering material that will permit a more economical manufacture of the cable; that will effect a substantial reduction in weight, per foot, of the cable; and which will deteriorate to a much lesser degree than the present day protective coverings.

Essentially, the invention consists in a protective covering material of woven mesh-like construction that can be produced at any desired locality to be later applied to the cable by the cable manufacturer as distinguished from a protective material that is formed in situ on the cable or conductor. To reduce the weight, per foot, of the cable, this woven mesh-like material is composed of warp elements each formed of a plurality of thicknesses of paper, said warp elements being connected together preferably by vegetable fiber weft elements or other means may be utilized for connecting together the warp elements. It is also preferred to have the warp elements of this woven mesh-like construction made of composite form in that there is encased in each warp element a shock resisting material, such as a metallic strip. This is important in that by having the composite material a layer of paper and a shock resisting material may be simultaneously applied in the building up of the protective covering, thus resulting in a much more economical manufacture as compared with those instances where similar materials are applied successively or by separate and independent operations.

With these and other objects in view, the invention consists in certain novel details of construction and combinations and arrangements of parts all as will hereinafter be more fully described and the novel features thereof particularly pointed out in the appended claims.

In the accompanying drawings,

Figure 1 is a perspective view of the preferred embodiment of the present invention;

Figure 2 is a modified form of the protective material;

Figure 3 illustrates a still further modification;

Fig. 4 is a cross sectional view of one of the warp elements; and

Figure 5 is a diagrammatical out-lay illustrating the construction of steel tape armored cable as manufactured at the present day, especially for underground usage.

As heretofore indicated the invention, in its broader aspect, consists of a woven mesh-like protective material consisting essentially of warp members each composed of a plurality of thicknesses of paper, these warp members preferably being connected by weft elements composed of vegetable fiber.

In the form of invention illustrated in Figure 1, the warp elements 20 are composed of folded paper tape secured together in woven mesh-like form by paper yarns or twine 21 interlaced with said warp elements. Preferably, but not necessarily, there is embedded or encased within these warp elements 20 a shock resisting material such as strips of metal 22. The warp elements 20 need not be accurately folded paper tapes as they may be made of paper crushed or twisted, it only being requisite that they be formed of a plurality of plies of paper in which the shock resisting elements 22 can be embedded or enclosed as would be the case with twisted paper. This mesh-like material is made up of a narrow woven strip of proper dimensions so that in the production of the cable itself this strip can be wound upon the cable in the building up of the entire protective covering.

In the form of invention illustrated in Figure 2, the warp elements 20 are connected together by strips of paper, the warp elements being attached to the strips of paper by suitable adhesive material. Thus, in this illustration, the strips of paper for connecting together the warp elements are indicated at 23 and while they may be interlaced with said warp elements they are preferably laid on only one side thereof because of the adhesive which is carried thereon for securing the warp elements thereto.

In the construction shown in Figure 3, the warp elements 20 are connected together by metallic fastening means such as clips 24. In the modification illustrated in Figure 3, the shock resisting material may be of less width than the warp elements in order to permit easy penetration of the warp elements by the metal clips 24.

In each instance, the material, after it is thus formed, is saturated with a suitable waterproofing compound which acts as a preservative to prevent deterioration. The waterproofing material will also fill the interstices in the mesh-like body and thereby eliminate all air spaces. This is particularly true where the compound is applied to both sides of the layer of insulating material.

Referring to Figure 5 it will be understood that the operations indicated take place after a lead sheath has been applied to the electrical conducting material or wire. In the cables used at the present time, especially those adapted to be placed under ground, there are sixteen operations as indicated in Figure 5. Amongst these operations are the two windings or layers of jute applied at operations four, six and twelve; the application of two wrappings of steel tape at operations eight and ten, these tapes serving as shock resisting elements; and the application of the preservative or waterproofing compound (oil) at operation nine. With the use of the material of the present invention these sixteen operations are reduced to thirteen, because with the present material applied in the making up of the protective covering at steps four, six and twelve, in lieu of the jute heretofore used at those points, operations eight, nine and ten can be eliminated. As the result the cable can be manufactured more economically due to the composite nature of the present material in that it carries with it the reinforcing material as well as its own preservative and air space eliminator, thereby eliminating three operations. As before pointed out, the present material will not deteriorate as quickly, especially when placed under ground because the paper will not be affected adversely to the same extent as jute by the elements which it encounters. The third important feature of the present invention is the reduction in weight of the finished product.

What I claim is:

1. A shock-resistant wrapping tape for reinforced insulated electric cable comprising a plurality of narrow full-length warp members each of which consists of a flat metal core and a paper jacket tightly wound therearound, and a weft of paper twine interwoven with and binding said warp members in flat-tape form.

2. Flexible tape for formation by wrapping into a reinforcing and insulating jacket for electric cable comprising a plurality of full-length warp members each of which consists of a flexible metallic core and a paper jacket encasing said core, and a paper weft interwoven with and binding said warp members side by side in flat tape form.

3. Flexible tape for formation by wrapping into a reinforcing and insulating jacket for electric cable comprising a plurality of full-length warp members each of which consists of a thin narrow metallic core and a paper jacket encasing said core, and uniformly spaced transverse paper bridging members binding said warp members side by side in flat tape form.

4. Flexible tape for formation by wrapping into a reinforcing and insulating jacket for electric cable comprising a plurality of full-length warp members each of which consists of a thin narrow metalic core and a multi-ply paper jacket encasing said core, and uniformly spaced transverse paper bridging members binding said warp members side by side in flat tape form.

5. Intersticed flexible tape for formation by wrapping into a reinforcing and insulating jacket for electric cable comprising a plurality of full-length warp members each of which consists of a thin narrow metallic core and a paper jacket encasing said core, and uniformly spaced transverse paper bridging members tying said warp members together in spaced relation.

6. Flexible tape for formation by wrapping into a reinforcing and insulating jacket for electric cable comprising a plurality of full-length warp members each of which consists of a flexible metallic core and a paper jacket encasing said core, a paper weft interwoven with and binding said warp members side by side in flat form, and a waterproof coating impregnating said warp and weft members and filling the interstices therebetween.

7. Flexible tape for formation by wrapping into an insulating jacket for electric cable comprising a plurality of narrow full-length flat-folded paper warp members disposed side-by-side to constitute the main body of the tape, a flexible paper weft interwoven with said flat-folded warp members and binding them closely together in flat tape form, and a waterproof coating impregnating said warp and weft members and filling whatever interstices exist therebetween.

8. Flexible tape for formation by wrapping into a reinforcing and insulating jacket for electric cable comprising a plurality of full-length warp members each of which consists of a flat flexible metallic core and a paper jacket encasing said core, and a continuous weft of twine interwoven with said warp members and binding said warp members side by side in flat tape form.

9. Flexible tape for formation by wrapping into a reinforcing and insulating jacket for electric cable comprising a plurality of full-length warp members each of which consists of a flat flexible metallic core and a paper jacket encasing said core, and a continuous sinuous weft of twine loosely interwoven with said warp members and binding said warp members side by side in flat tape form.

MILO C. DODGE.